US011889032B2

(12) United States Patent
Fan et al.

(10) Patent No.: US 11,889,032 B2
(45) Date of Patent: Jan. 30, 2024

(54) APPARATUS FOR ACQUIRING IMAGE AND METHOD FOR ACQUIRING IMAGE

(71) Applicant: Hangzhou Hikvision Digital Technology Co., Ltd., Zhejiang (CN)

(72) Inventors: Meng Fan, Zhejiang (CN); Hai Yu, Zhejiang (CN); Shiliang Pu, Zhejiang (CN)

(73) Assignee: Hangzhou Hikvision Digital Technology Co., Ltd., Zhejiang (CN)

(*) Notice: Subject to any disclaimer, the term of this patent is extended or adjusted under 35 U.S.C. 154(b) by 60 days.

(21) Appl. No.: 17/615,564

(22) PCT Filed: May 22, 2020

(86) PCT No.: PCT/CN2020/091906
§ 371 (c)(1),
(2) Date: Nov. 30, 2021

(87) PCT Pub. No.: WO2020/238804
PCT Pub. Date: Dec. 3, 2020

(65) Prior Publication Data
US 2022/0247980 A1 Aug. 4, 2022

(30) Foreign Application Priority Data

May 31, 2019 (CN) .......................... 201910472690.3

(51) Int. Cl.
*H04N 5/335* (2011.01)
*H04N 25/13* (2023.01)
(Continued)

(52) U.S. Cl.
CPC ............. *H04N 25/134* (2023.01); *H04N 5/33* (2013.01); *H04N 23/54* (2023.01); *H04N 23/55* (2023.01);
(Continued)

(58) Field of Classification Search
CPC ...................................................... H04N 23/12
See application file for complete search history.

(56) References Cited

U.S. PATENT DOCUMENTS

2006/0066738 A1 3/2006 Hershey et al.
2006/0268367 A1* 11/2006 Hayashide ............. H04N 1/484
358/474
(Continued)

FOREIGN PATENT DOCUMENTS

CN 1638435 A 7/2005
CN 104954658 A 9/2015
(Continued)

OTHER PUBLICATIONS

International search report of PCT application No. PCT/CN2020/091906 dated Jul. 23, 2020.
(Continued)

*Primary Examiner* — Gary C Vieaux
(74) *Attorney, Agent, or Firm* — Knobbe, Martens, Olson & Bear LLP

(57) ABSTRACT

An apparatus for acquiring an image includes an image sensor, a light compensator, and a light filter assembly. The image sensor is on a light output side of the light filter assembly, and is configured to generate and output a first image signal and a second image signal by a plurality of exposures. The first image signal is generated according to a first preset exposure and the second image signal is generated according to a second preset exposure, and they are two of the plurality of exposures. The light compensator includes a first light compensation apparatus, the first light compensation apparatus is configured to perform near-infrared light compensation, and the near-infrared light compensation is performed in at least part of an exposure period
(Continued)

of the first preset exposure but is not performed in an exposure period of the second preset exposure.

18 Claims, 10 Drawing Sheets

(51) Int. Cl.
  *H04N 5/33* (2023.01)
  *H04N 23/54* (2023.01)
  *H04N 23/55* (2023.01)
  *H04N 25/131* (2023.01)
  *H04N 25/133* (2023.01)
  *H04N 25/531* (2023.01)

(52) U.S. Cl.
  CPC ......... *H04N 25/131* (2023.01); *H04N 25/133* (2023.01); *H04N 25/531* (2023.01)

(56) References Cited

U.S. PATENT DOCUMENTS

| | | |
|---|---|---|
| 2012/0025080 A1 | 2/2012 | Liu et al. |
| 2012/0105963 A1 | 5/2012 | Klinghult et al. |
| 2013/0328834 A1 | 12/2013 | Swamy |
| 2015/0163471 A1 | 6/2015 | Liu et al. |
| 2015/0245767 A1 | 9/2015 | Northcott et al. |
| 2021/0152728 A1* | 5/2021 | Li ........................... H04N 23/55 |

FOREIGN PATENT DOCUMENTS

| | | |
|---|---|---|
| CN | 106709477 A | 5/2017 |
| CN | 107566747 A | 1/2018 |
| CN | 108419061 A | 8/2018 |
| CN | 108419062 A | 8/2018 |
| CN | 109963086 A | 7/2019 |
| CN | 110490041 A | 11/2019 |
| CN | 110490042 A | 11/2019 |
| CN | 110490187 A | 11/2019 |
| CN | 110493491 A | 11/2019 |
| CN | 110493492 A | 11/2019 |
| CN | 110493493 A | 11/2019 |
| CN | 110493494 A | 11/2019 |
| CN | 110493495 A | 11/2019 |
| CN | 110493496 A | 11/2019 |
| CN | 110493533 A | 11/2019 |
| CN | 110493535 A | 11/2019 |
| CN | 110493536 A | 11/2019 |
| CN | 110493537 A | 11/2019 |
| CN | 110505376 A | 11/2019 |
| CN | 110505377 A | 11/2019 |
| CN | 110519489 A | 11/2019 |
| DE | 3036522 A1 | 4/1981 |
| WO | WO-2020024623 A1 * | 2/2020 ........... H04N 5/2254 |

OTHER PUBLICATIONS

First office action of Chinese application No. 201910472690.3 dated Jul. 30, 2020.
Notification to grant patent right for invention of Chinese application No. 201910472690.3 dated Jan. 29, 2021.
Extended European search report of counterpart European application No. 20814054.1 dated Apr. 13, 2022.

* cited by examiner

APPARATUS FOR ACQUIRING IMAGE AND METHOD FOR ACQUIRING IMAGE

CROSS-REFERENCE TO RELATED APPLICATIONS

This application is US national phase of a PCT international application No. PCT/CN2020/091906, filed on May 22, 2020 and entitled "IMAGE ACQUISITION APPARATUS AND IMAGE ACQUISITION METHOD", which claims priority to Chinese Patent Application No. 201910472690.3, filed on May 31, 2019 and entitled "APPARATUS AND METHOD FOR ACQUIRING IMAGE," the disclosures of which are herein incorporated by reference in their entireties.

TECHNICAL FIELD

The present disclosure relates to the field of computer vision, and in particular to an apparatus and a method for acquiring an image.

BACKGROUND

Light can be divided into visible light and invisible light according to whether human eyes can perceive it. Near-infrared light is one of the invisible light. A visible light image contains brightness information of visible light; and a near-infrared light image contains brightness information of near-infrared light. Currently, a common shooting device can acquire different images depending on different intensities of visible light in an external scenario, so that acquisition of information about the external scenario is not limited by the intensities of the visible light. For example, the shooting device can acquire a visible light image when an intensity of the visible light is high in the external scenario, and acquire a near-infrared light image when an intensity of the visible light is low in the external scenario, thereby acquiring information about the external scenario under different visible light intensities.

In the related art, a method for acquiring visible light images and near-infrared light images according to a binocular camera is provided. The binocular camera includes a visible light camera and a near-infrared light camera. The binocular camera can acquire a visible light image via the visible light camera, and acquire a near-infrared light image via the near-infrared light camera. However, because viewpoints of the visible light camera and the near-infrared light camera of the binocular camera are different, shooting ranges of the visible light camera and the near-infrared light camera only overlap partially. In addition, during image acquisition, the binocular camera has problems of a complex structure and a high cost.

SUMMARY

The present disclosure provides an apparatus and a method for acquiring an image, to acquire two different image signals while simplifying a structure and reducing a cost. The technical solutions are as follows.

According to a first aspect, an apparatus for acquiring an image is provided. The apparatus for acquiring an image includes an image sensor, a light compensator, and a light filter assembly, wherein the image sensor is on a light output side of the light filter assembly; the image sensor is configured to generate and output a first image signal and a second image signal by a plurality of exposures, wherein the first image signal is generated according to a first preset exposure; the second image signal is generated according to a second preset exposure, and the first preset exposure and the second preset exposure are two of the plurality of exposures; the light compensator includes a first light compensation apparatus, wherein the first light compensation apparatus is configured to perform near-infrared light compensation, the near-infrared light compensation is performed in at least part of an exposure period of the first preset exposure but is not performed in an entire exposure period of the second preset exposure; and the light filter assembly includes a first light filter, wherein the first light filter allows light in a visible light wave band and part of light in a near-infrared light wave band to pass through.

According to another aspect, a method for acquiring an image is provided. The method is applied to an apparatus for acquiring an image, wherein the apparatus for acquiring an image includes an image sensor, a light compensator, and a light filter assembly, the light compensator includes a first light compensation apparatus, the light filter assembly includes a first light filter, the image sensor is disposed on a light output side of the light filter assembly, and the method includes: performing near-infrared light compensation by the first light compensation apparatus, wherein the near-infrared light compensation is performed in at least part of an exposure period of a first preset exposure, but is not performed in an exposure period of a second preset exposure, and the first preset exposure and the second preset exposure are two of a plurality of exposures performed by the image sensor; enabling visible light and part of near-infrared light to pass through the first light filter; and performing the plurality of exposures by the image sensor, to generate and output a first image signal and a second image signal, wherein the first image signal is generated according to the first preset exposure; and the second image signal is generated according to the second preset exposure.

The technical solutions according to the present disclosure may achieve the following benefits: according to the present disclosure, an exposure time sequence of an image sensor is used to control a near-infrared light compensation time sequence of a light compensation apparatus, so that a first image signal is generated according to a first preset exposure when near-infrared light compensation is performed, and a second image signal is generated according to a second preset exposure when near-infrared light compensation is not performed. In this data acquisition manner, the first image signal and the second image signal that have different brightness information can be acquired while a structure is simplified and a cost is reduced. That is, two different image signals can be acquired by using one image sensor, which makes the apparatus for acquiring an image to be simpler and more convenient, and acquiring the first image signal and the second image signal to be more efficiently. In addition, because both the first image signal and the second image signal are generated and output by the same image sensor, viewpoints corresponding to the first image signal and the second image signal are the same. Therefore, the first image signal and the second image signal can jointly acquire information about an external scenario, and there is no misalignment of images generated according to the first image signal and the second image signal because the viewpoint corresponding to the first image signal is not the same as the viewpoint corresponding to the second image signal.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

Figure 1:
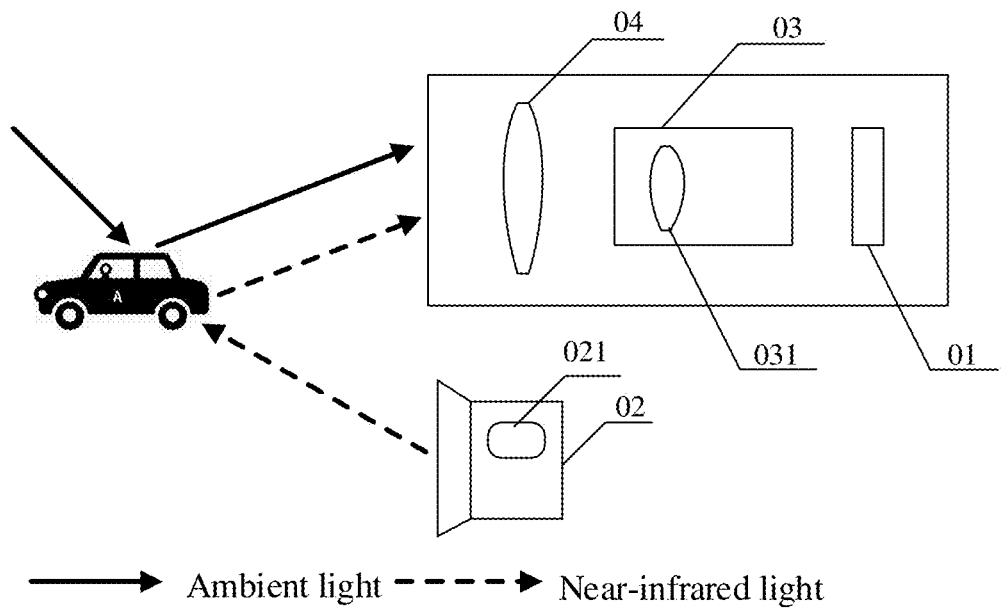
FIG. 1 is a schematic structural diagram of a first apparatus for acquiring an image according to an embodiment of the present disclosure.

Reference numerals in the accompanying drawings are as follows:

01: image sensor, 02: light compensator, 03: light filter assembly, 04: lens,

021: first light compensation apparatus, 022: second light compensation apparatus, 031: first light filter, 032: second light filter, and 033: switching component.

DETAILED DESCRIPTION

Exemplary embodiments are described in detail herein, and examples of the exemplary embodiments are presented in the accompanying drawings. When the following description relates to the accompanying drawings, unless specified otherwise, same numbers in different accompanying drawings represent a same element or similar elements. Implementations described in the following exemplary embodiments do not represent all implementations consistent with the present disclosure. On the contrary, they are only examples of apparatuses and methods that are consistent with some aspects of the present disclosure.

FIG. 1 is a schematic structural diagram of an apparatus for acquiring an image according to an embodiment of the present disclosure. Referring to FIG. 1, the apparatus for acquiring an image includes an image sensor 01, a light compensator 02, and a light filter assembly 03. The image sensor 01 is disposed on a light output side of the light filter assembly 03. The image sensor 01 is configured to generate and output a first image signal and a second image signal via a plurality of exposures. The first image signal is generated based on a first preset exposure, the second image signal is generated based on a second preset exposure, and the first preset exposure and the second preset exposure are two of the plurality of exposures. The light compensator 02 includes a first light compensation apparatus 021 which is configured to perform near-infrared light compensation. The near-infrared light compensation is performed in at least part of an exposure period of the first preset exposure but is not performed in an exposure period of the second preset exposure. The light filter assembly 03 includes a first light filter 031 which allows light in a visible light wave band and light in a near-infrared light wave band to pass through. An intensity of near-infrared light passing through the first light filter 031 when the first light compensation apparatus 021 performs the near-infrared light compensation is higher than an intensity of near-infrared light passing through the first light filter 031 when the first light compensation apparatus 021 does not perform the near-infrared light compensation.

In this embodiment of the present disclosure, referring to FIG. 1, the apparatus for acquiring an image may further include a lens 04. In this case, the light filter assembly 03 may be disposed between the lens 04 and the image sensor 01, and the image sensor 01 is disposed on the light output side of the light filter assembly 03. Alternatively, the lens 04 is disposed between the light filter assembly 03 and the image sensor 01, and the image sensor 01 is disposed on a light output side of the lens 04. As an example, the first light filter 031 may be a light filtering film. In this case, in a case that the light filter assembly 03 is disposed between the lens 04 and the image sensor 01, the first light filter 031 may be attached to a surface at the light output side of the lens 04; or, in a case that the lens 04 is disposed between the light filter assembly 03 and the image sensor 01, the first light filter 031 may be attached to a surface at a light incident side of the lens 04.

It should be noted that the light compensator 02 may be disposed inside or outside the apparatus for acquiring an image. The light compensator 02 may be a part of the apparatus for acquiring an image or a device independent of the apparatus for acquiring an image. In a case that the light compensator 02 is disposed outside the apparatus for acquiring an image, the light compensator 02 may be in communication connection with the apparatus for acquiring an image, thereby ensuring that there is a certain relationship between an exposure time sequence of the image sensor 01 in the apparatus for acquiring an image and a near-infrared light compensation time sequence of the first light compensation apparatus 021 included in the light compensator 02. For example, the near-infrared light compensation is performed in at least part of an exposure period of the first preset exposure, but is not performed in an exposure period of the second preset exposure.

In addition, the first light compensation apparatus 021 may be a near-infrared light emitting apparatus, for example, a near-infrared light compensation lamp. The first light compensation apparatus 021 may perform the near-infrared light compensation in a stroboscopic manner or similar manner. This is not limited in this embodiment of the present disclosure. In some examples, when performing the near-infrared light compensation in the stroboscopic manner, the first light compensation apparatus 021 may be controlled manually or by a software program or specific device. This is not limited in this embodiment of the present disclosure. A period in which the first light compensation apparatus 021 performs the near-infrared light compensation may coincide with, greater than, or less than the exposure period of the first preset exposure, as long as the near-infrared light compensation is performed in the entire or part of exposure period of the first preset exposure, but is not performed in the exposure period of the second preset exposure.

It should be noted that, the near-infrared light compensation is not performed in the exposure period of the second preset exposure. For a global shutter manner, the exposure period of the second preset exposure may be a period between an exposure start moment and an exposure end moment. For a rolling shutter manner, the exposure period of the second preset exposure may be a period between an exposure start moment for a first row of effective images of the second image signal and an exposure end moment for the last row of effective images of the second image signal. However, the exposure period of the second preset exposure is not limited thereto. For example, the exposure period of the second preset exposure may alternatively be an exposure period corresponding to a target image in the second image signal, the target image is several rows of effective images that are in the second image signal and correspond to a target object or target area, and a period between an exposure start moment and an exposure end moment of the several rows of effective images may be considered as the exposure period of the second preset exposure.

It should be further noted that, when the first light compensation apparatus 021 performs the near-infrared light compensation for an external scenario, near-infrared light incident to a surface of an object may be reflected by the object, thereby entering the first light filter 031. In normal circumstances, ambient light may include visible light and near-infrared light, and the near-infrared light in the ambient light which is incident to a surface of an object may also be reflected by the object, thereby entering the first light filter 031. Therefore, in a case that the near-infrared light compensation is performed, near-infrared light passing through the first light filter 031 may include near-infrared light that is reflected into the first light filter 031 by an object when the first light compensation apparatus 021 performs the near-infrared light compensation; and in a case that the near-infrared light compensation is not performed, near-infrared light passing through the first light filter 031 may include near-infrared light that is reflected into the first light filter 031 by an object when the first light compensation apparatus 021 does not perform the near-infrared light compensation. In other words, in a case that the near-infrared light compensation is performed, the near-infrared light passing through the first light filter 031 includes the near-infrared light that is emitted by the first light compensation apparatus 021 and reflected by an object, and the near-infrared light that is in the ambient light and reflected by an object; and in a case that the near-infrared light compensation is not performed, the near-infrared light passing through the first light filter 031 includes the near-infrared light that is in the ambient light and reflected by the object.

Figure 2:
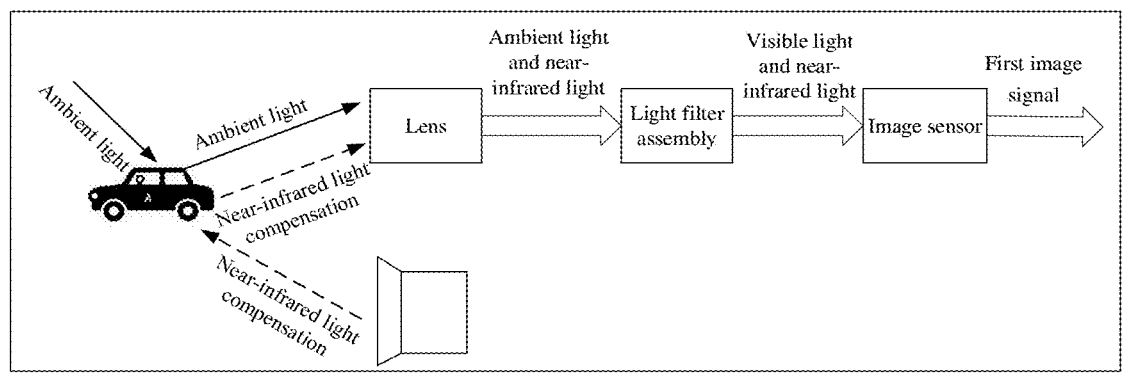
FIG. 2 is a schematic diagram of a principle of generating a first image signal by an apparatus for acquiring an image according to an embodiment of the present disclosure.
Figure 3:
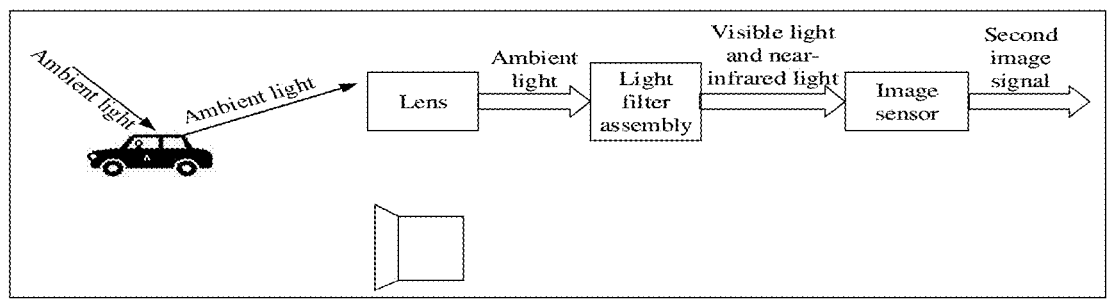
FIG. 3 is a schematic diagram of a principle of generating a second image signal by an apparatus for acquiring an image according to an embodiment of the present disclosure.

In the apparatus for acquiring an image, a structural feature that the light filter assembly 03 is disposed between the lens 04 and the image sensor 01 and the image sensor 01 is disposed on the light output side of the light filter assembly 03 is used as an example. A process in which the apparatus for acquiring an image acquires the first image signal and the second image signal is as follows. Referring to FIG. 2, when the image sensor 01 performs the first preset exposure, the first light compensation apparatus 021 performs the near-infrared light compensation. In this case, after ambient light in a shooting scenario and near-infrared light, which is reflected by an object in the scenario when the first light compensation apparatus performs the near-infrared light compensation, pass through the lens 04 and the first light filter 031, the image sensor 01 generates the first image signal based on the first preset exposure. Referring to FIG. 3, when the image sensor 01 performs the second preset exposure, the first light compensation apparatus 021 does not perform the near-infrared light compensation. In this case, after the ambient light in the shooting scenario passes through the lens 04 and the first light filter 031, the image sensor 01 generates the second image signal based on the second preset exposure. In a frame period for image acquisition, there may be M first preset exposures and N second preset exposures; and there may be a plurality of sorting combinations for the first preset exposures and second preset exposures. In a frame period for image acquisition, values of M and N and a relationship between the values of M and N may be set according to actual requirements. For example, the values of M and N may be the same or different.

It should be noted that, the first light filter 031 may allow part of near-infrared light to pass through. In other words, the near-infrared light passing through the first light filter 031 may be part of near-infrared light or all near-infrared light. This is not limited in this embodiment of the present disclosure.

In addition, an intensity of the near-infrared light in the ambient light is lower than an intensity of the near-infrared light emitted by the first light compensation apparatus 021. Therefore, an intensity of the near-infrared light passing through the first light filter 031 when the first light compensation apparatus 021 performs the near-infrared light compensation is higher than an intensity of the near-infrared light passing through the first, light filter 031 when the first light compensation apparatus 021 does not perform the near-infrared light compensation.

A wave band range for the near-infrared light compensation by the first light compensation apparatus 021 may be a second reference wave band range, which may range from 700 nm to 800 nm, or from 900 nm to 1000 nm. In this way, common interference caused by an 850-nm near-infrared lamp can be reduced. In addition, a wave band range of near-infrared light incident to the first light filter 031 may be a first reference wave band range, and the first reference wave band range is 650 nm to 1100 nm.

In a case that the near-infrared light compensation is performed, near-infrared light passing through the first light filter 031 may include near-infrared light, which is reflected into the first light filter 031 by an object when the first light compensation apparatus 021 performs the near-infrared light compensation, and near-infrared light that is in the ambient light and reflected by an object. Therefore, an intensity of near-infrared light entering the light filter assembly 03 is higher. However, in a case that the near-infrared light compensation is not performed, near-infrared light passing through the first light filter 031 includes near-infrared light that is in the ambient light and reflected into the light filter assembly 03 by an object, because there is no near-infrared light compensated by the first light compensation apparatus 021, an intensity of the near-infrared light passing through the first light filter 031 is weaker. Therefore, an intensity of near-infrared light included in the first image signal, which is generated and output based on the first preset exposure, is higher than an intensity of near-infrared light included in the second image signal, which is generated and output based on the second preset exposure.

There may be a plurality of options for a central wavelength and/or a wave band range for the near-infrared light compensation by the first light compensation apparatus 021. In this embodiment of the present disclosure, in order to make the first light compensation apparatus 021 and the first light filter 031 have better cooperation, the central wavelength for the near-infrared light compensation by the first light compensation apparatus 021 may be designed, and a feature of the first, light filter 031 may be selected, so that when the central wavelength for the near-infrared light compensation by the first light compensation apparatus 021 is a specified characteristic wavelength or falls within a specified characteristic wavelength range, a central wavelength and/or a wave-band width of the near-infrared light passing through the first light filter 031 meet(s) a constraint condition. The constraint condition is mainly used to restrict the central wavelength of the near-infrared light passing through the first light filter 031 to be as accurate as possible, and restrict the wave-band width of the near-infrared light passing through the first light filter 031 to be as narrow as possible, thereby avoiding wavelength interference due to the wave-band width of the near-infrared light is too large.

The central wavelength for the near-infrared light compensation by the first light compensation apparatus 021 may be an average of a wavelength range with maximum energy in a spectrum of the near-infrared light emitted by the first light compensation apparatus 021; or may be a wavelength at a middle of a wavelength range with energy exceeding a certain threshold in the spectrum of the near-infrared light emitted by the first light compensation apparatus 021.

Figure 4:
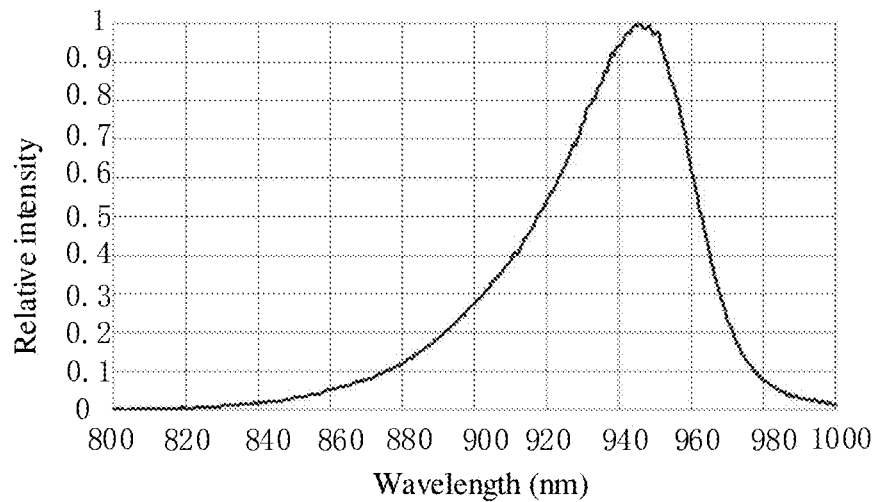
FIG. 4 is a schematic diagram of a relationship between a wavelength and a relative intensity for near-infrared light compensation by a first light compensation apparatus according to an embodiment of the present disclosure.

The specified characteristic wavelength or the specified characteristic wavelength range may be preset. As an example, the central wavelength for the near-infrared light compensation by the first light compensation apparatus 021 may be any one in a wavelength range of 740 nm to 760 nm, or any one in a wavelength range of 770 nm to 790 nm, or any one in a wavelength range of 930 nm to 950 nm. In other words, the specified characteristic wavelength may be the wavelength ranging from 740 nm to 760 nm, or the wavelength ranging from 770 nm to 790 nm, or the wavelength ranging from 930 nm to 950 nm. For example, the central wavelength for the near-infrared light compensation by the first light compensation apparatus 021 is 940 nm. A relationship between a wavelength and a relative intensity for the near-infrared light compensation by the first light compensation apparatus 021 is shown in FIG. 4. It can be learned from FIG. 4 that a wave band range for the near-infrared light compensation by the first light compensation apparatus 021 is 900 nm to 1000 nm. When the wavelength of the near-infrared light is 940 nm, the relative intensity of the near-infrared light is the highest.

In a case that near-infrared light compensation is performed, most of the near-infrared light passing through the first light filter 031 is the near-infrared light that is reflected into the first light filter 031 by an object when the first light compensation apparatus 021 performs the near-infrared light compensation. Therefore, in some embodiments, the foregoing constraint condition may include a difference between the central wavelength of the near-infrared light passing through the first light filter 031 and the central wavelength for the near-infrared light compensation by the first light compensation apparatus 021 is within a wavelength fluctuation range. As an example, the wavelength fluctuation ranges from 0 nm to 20 nm.

A central wavelength for near-infrared light by the first light filter 031 may be a wavelength at a peak in a near-infrared light wave band range in a near-infrared passing rate curve of the first light filter 031, or it may be understood as a wavelength at a middle position in a near-infrared light wave band range with a passing rate exceeding a certain threshold in the near-infrared passing rate curve of the first light filter 031.

In order to avoid wavelength interference due to a waveband width of the near-infrared light passing through the first light filter 031 is too large, in some embodiments, the foregoing constraint condition may include a first waveband width may be less than a second wave-band width. The first wave-band width is a wave-band width of the near-infrared light passing through the first light filter 031, and the second wave-band width is a wave-band width of near-infrared light blocked by the first light filter 031. It should be understood that a wave-band width is a width of a wavelength range to which a wavelength of light belongs. For example, in a case that a wavelength range to which a wavelength of the near-infrared light passing through the first light filter 031 is 700 nm to 800 nm, the first wave-band width is 100 nm, that is, it is acquired by subtracting 700 nm from 800 nm. In other words, the wave-band width of the near-infrared light passing through the first light filter 031 is less than the wave-band width of the near-infrared light blocked by the first light filter 031.

Figure 5:
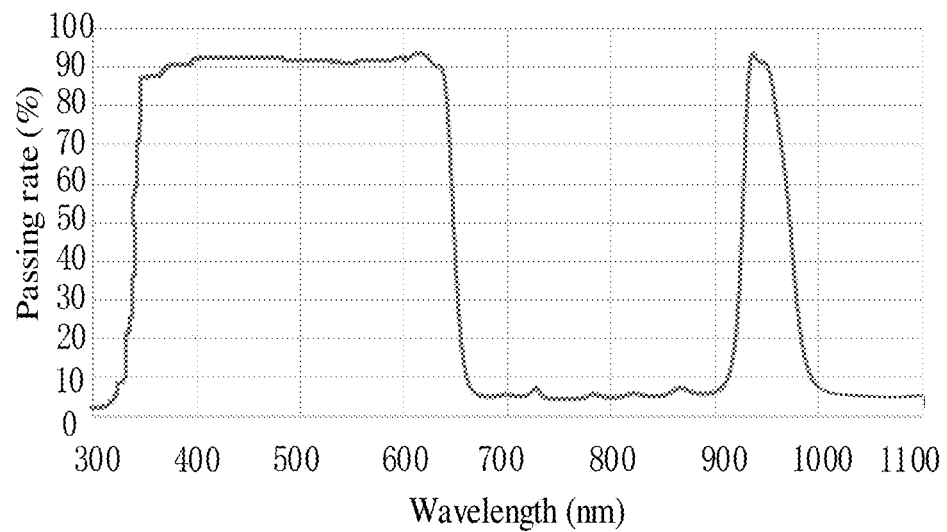
FIG. 5 is a schematic diagram of a relationship between a wavelength and a passing rate of light passing through a first light filter according to an embodiment of the present disclosure.

For example, FIG. 5 is a schematic diagram of a relationship between a wavelength and a passing rate of light that can pass through a first light filter 031. A wave band of near-infrared light incident to the first light filter 031 ranges from 650 nm to 1100 nm. The first light filter 031 allows visible light with wavelength ranging from 380 nm to 650 nm and near-infrared light with wavelength ranging from 900 nm to 1100 nm to pass through, and blocks near-infrared light with wavelength ranging from 650 nm to 900 nm. In other words, the first wave-bandwidth is 100 nm, that is, it is acquired by subtracting 900 nm from 1000 nm. The second wave-band width is 350 nm, that is, it is a difference of 900 nm minus 650 nm plus a difference of 1100 nm minus 1000 nm. 100 nm is less than 350 nm, that is, the wave-band width of the near-infrared light passing through the first light filter 031 is less than the wave-band width of the near-infrared light blocked by the first light filter 031. The foregoing relationship curve is merely an example. Fi different light filters, wave band ranges of near-infrared light that can pass through the light filters may be different; and wave band ranges of near-infrared light blocked by the light filters may also be different.

In order to avoid wavelength interference due to a wave-hand width of the near-infrared light passing through the first light filter 031 is too wide in a period when near-infrared light compensation is not performed, in some embodiments, the foregoing constraint condition may include a semi-bandwidth of the near-infrared light passing through the first light filter is less than or equal to 50 nm, and the semi-bandwidth is a wave-band width of near-infrared light with a passing rate greater than 50%.

In order to avoid wavelength interference due to a wave-band width of the near-infrared light passing through the first light filter 031 is too large, in some embodiments, the foregoing constraint condition may include a third wave-band width is less than a reference wave-band width. The third wave-band width is a wave-band width of near-infrared light with a passing rate greater than a specified proportion. As an example, the reference wave-band width may be any wave-band width in a wave band ranging from 50 nm to 100 nm. The specified proportion may be any proportion in a range from 30% to 50%. Certainly, the specified proportion may also be set to another proportion according to a usage requirement. This is not limited in this embodiment of the present disclosure. In other words, the wave-band width of the near-infrared light with a passing rate greater than the specified proportion may be less than the reference wave-band width.

For example, referring to FIG. 5, the wave band of the near-infrared light incident to the first light filter 031 is 650 nm to 1100 nm, the specified proportion is 30%, and the reference wave-band width is 100 nm. It can be learned from FIG. 5 that, in the 650 nm-to-1100 nm light wave band of the near-infrared light, a wave-band width of near-infrared light with a passing rate greater than 30% is obviously less than 100 nm.

The first light compensation apparatus 021 performs the near-infrared light compensation in at least part of an exposure period of a first preset exposure, but does not perform the near-infrared light compensation in an entire exposure period of a second preset exposure; and the first preset exposure and the second preset exposure are two of a plurality of exposures performed by the image sensor. In other words, the first light compensation apparatus 021 performs the near-infrared light compensation in exposure periods of a part of exposures of the image sensor 01, but does not perform the near-infrared light compensation in exposure periods of the other exposures of the image sensor 01. Therefore, the number of light compensation performed by the first light compensation apparatus 021 in unit time may be less than the number of exposures performed by the image sensor 01 in unit time, and one or more exposures are performed between every two adjacent times of light compensation.

Figure 6:
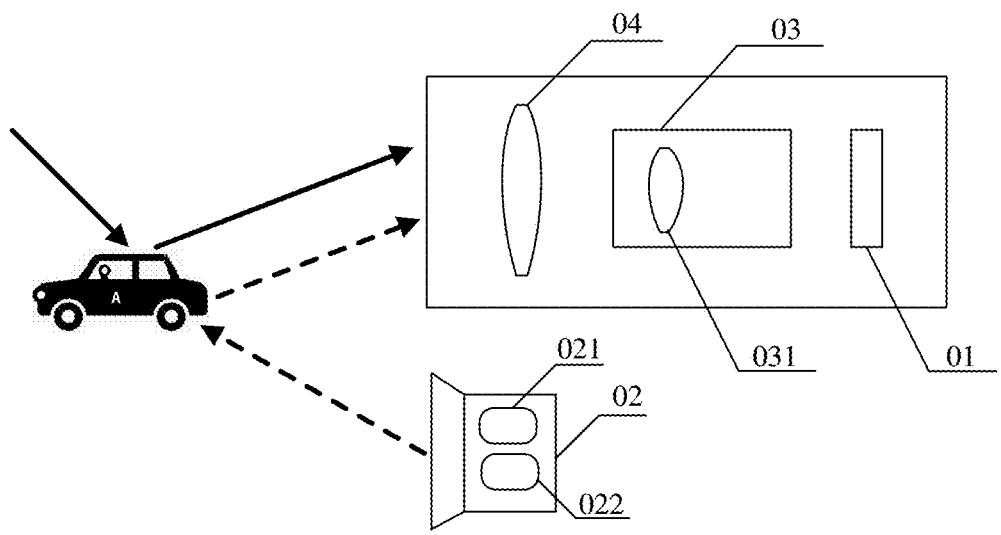
FIG. 6 is a schematic structural diagram of a second apparatus for acquiring an image according to an embodiment of the present disclosure.

In some possible embodiments, because it is easy for human eyes to confuse a color for the near-infrared light compensation by the first light compensation apparatus 021 with a color of a red light in a traffic light, the light compensator 02 may further include a second light compensation apparatus 022, as shown in FIG. 6. The second light compensation apparatus 022 is configured to perform visible light compensation. In this way, if the second light compensation apparatus 022 performs the visible light compensation in at least part of the exposure period of the first preset exposure, that is, the near-infrared light compensation and the visible light compensation are performed in at least part of the exposure period of the first preset exposure, a mixed color of the two types of light can be different from the color of the red light in the traffic light, thereby avoiding human eyes from confusing the color for the near-infrared light compensation by the light compensator 02 with the color of the red light in the traffic light. In addition, if the second light compensation apparatus 022 performs the visible light compensation in the exposure period of the second preset exposure, because an intensity of the visible light in the exposure period of the second preset exposure is not very high, when the visible light compensation is performed in the exposure period of the second preset exposure, brightness of the visible light in the second image signal may be increased, thereby guaranteeing image acquisition quality.

In some embodiments, the second light compensation apparatus 022 may be configured to perform the visible light compensation in a normally bright manner; or the second light compensation apparatus 022 may be configured to perform the visible light compensation in a stroboscopic manner, and the visible light, compensation is performed in at least part, of the exposure period of the first preset exposure but is not performed in the entire exposure period of the second preset exposure. Or, the second light compensation apparatus 022 may be configured to perform the visible light compensation in a stroboscopic manner, the visible light compensation is not performed in at least the entire exposure period of the first preset exposure but is performed in part of the exposure period of the second preset exposure. When the second light compensation apparatus 022 performs the visible light compensation in the normally bright manner, it can not only avoid human eyes from confusing the color for the near-infrared light compensation by the first light compensation apparatus 021 with the color of the red light in the traffic light, but can also improve brightness of visible light in the second image signal, thereby guaranteeing image acquisition quality. When the second light compensation apparatus 022 performs the visible light compensation in the stroboscopic manner, it can avoid human eyes from confusing the color for the near-infrared light compensation by the first light compensation apparatus 021 with the color of the red light in the traffic light, or can improve the brightness of the visible light in the second image signal, thereby guaranteeing image acquisition quality. In addition, the number of light compensation performed by the second light compensation apparatus 022 can be reduced and thus a service life of the second light compensation apparatus 022 is prolonged.

In some embodiments, the plurality of exposures refer to a plurality of exposures in a frame period. In other words, the image sensor 01 performs the plurality of exposures in a frame period, thereby generating and outputting at least one frame of a first image signal and at least one frame of a second image signal. For example, one second includes 25 frame periods and the image sensor 01 performs the plurality of exposures in each frame period, thereby generating at least one frame of a first image signal and at least one frame of a second image signal. First image signals and second image signals that are generated in one frame period are referred to as a set of image signals. In this way, 25 sets of image signals are generated in 25 frame periods. The first preset exposure and the second preset exposure may be two adjacent or nonadjacent exposures in the plurality of exposures in a frame period. This is not limited in this embodiment of the present disclosure.

The first image signal is generated and output based on the first preset exposure, and the second image signal is generated and output based on the second preset exposure. The first image signal and the second image signal may be processed after being generated and output. In some scenarios, uses of the first image signal and the second image signal may be different. Therefore, in some embodiments, at least one exposure parameter of the first preset exposure may be different from that of the second preset exposure. As an example, the at least one exposure parameter may include but is not limited to one or more of exposure time, an exposure gain, and an aperture size, and the exposure gain includes an analog gain and/or a digital gain.

In some embodiments, it may be understood that, compared with the second preset exposure, an intensity of near-infrared light sensed by the image sensor 01 is higher when the image sensor 01 performs the near-infrared light compensation, and brightness of the near-infrared light included in the first image signal, which is accordingly generated and output, is higher. However, the higher brightness of near-infrared light with is not good for the acquisition of information about an external scenario. In addition, in some embodiments, the greater the exposure gain, the higher the brightness of an image signal output by the image sensor 01; and the smaller the exposure gain, the lower the brightness of the image signal output by the image sensor 01. Therefore, in order to ensure that the brightness of the near-infrared light included in the first image signal is in an appropriate range, at least one exposure parameter of the first preset exposure is different front that of the second preset exposure. For example, an exposure gain of the first preset exposure may be less than an exposure gain of the second preset exposure. In this case, the brightness of the near-infrared light included in the first image signal generated and output by the image sensor 01 may not be too high due to the near-infrared light compensation by the first light compensation apparatus 021.

In some other embodiments, the longer the exposure time, the higher the brightness included in an image signal acquired by the image sensor 01, and the longer the motion trail of an object moving in an external scenario and in the image signal; and the shorter exposure time, the lower brightness included in the image signal acquired by the image sensor 01, and the shorter motion trail of the object moving in the external scenario and in the image signal. Therefore, to ensure that the brightness of the near-infrared light included in the first image signal is in an appropriate range, and a motion trail of an object moving in the external scenario and in the first image signal is short, at least one exposure parameter of the first preset exposure is different from that of the second preset exposure. For example, exposure time of the first preset exposure may be less than exposure time of the second preset exposure. In this case, the brightness of the near-infrared light included in the first image signal generated and output by the image sensor 01 may not be too high due to the near-infrared light compensation by the first light compensation apparatus 021. In addition, the shorter the exposure time, the shorter the motion trail of the object moving in the external scenario and in the first image signal, thereby facilitating recognition of the moving object. In an exemplary embodiment, the exposure time of the first preset exposure is 40 ms, and the exposure time of the second preset exposure is 60 ms.

It should be noted that, in some embodiments, when the exposure gain of the first preset exposure is less than the exposure gain of the second preset exposure, the exposure time of the first preset exposure may be less than or equal to the exposure time of the second preset exposure. Similarly, when the exposure time of the first preset exposure is less than the exposure time of the second preset exposure, the exposure gain of the first preset exposure may be less than or equal to the exposure gain of the second preset exposure In some other embodiments, uses of the first image signal and the second image signal may be the same. For example, when both the first image signal and the second image signal are used for intelligent analysis, in order to ensure that a human face or a target in a moving state has the same sharpness during intelligent analysis, at least one exposure parameter of the first preset exposure may be the same as that of the second preset exposure. As an example, the exposure time of the first preset exposure may be equal to the exposure time of the second preset exposure. If the exposure time of the first preset exposure is different from the exposure time of the second preset exposure, an image signal having longer exposure time has a motion trail. As a result, there is a sharpness difference between two image signals. Similarly, as another example, the exposure gain of the first preset exposure may be equal to the exposure gain of the second preset exposure.

It should be noted that, in some embodiments, when the exposure time of the first preset exposure is equal to the exposure time of the second preset exposure, the exposure gain of the first preset exposure may be less than or equal to the exposure gain of the second preset exposure. Similarly, when the exposure gain of the first preset exposure is equal to the exposure gain of the second preset exposure, the exposure time of the first preset exposure may be less than or equal to the exposure time of the second preset exposure.

The image sensor 01 may include a plurality of light sensing channels, and each light sensing channel may be configured to sense at least one type of light in a visible light wave band, and sense light in a near infrared light wave hand. In other words, each light sensing channel can sense not only the at least one type of light in the visible light wave hand, but also the light in the near-infrared light wave hand. Therefore, it can be ensured that the first image signal and the second image signal have full resolutions, and no pixel value is missed. In some possible embodiments, the plurality of light sensing channels may be configured to sense at least two different types of light in the visible light wave band.

Figure 7:
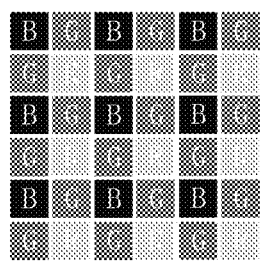
FIG. 7 is a schematic diagram of a red-green-blue (RGB) sensor according to an embodiment of the present disclosure.
Figure 8:
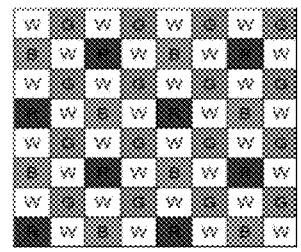
FIG. 8 is a schematic diagram of a red-green-blue-white (RGBW) sensor according to an embodiment of the present disclosure.
Figure 9:
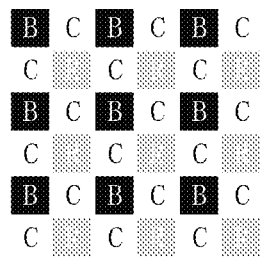
FIG. 9 is a schematic diagram of a red-cyan-cyan-blue (RCCB) sensor according to an embodiment of the present disclosure.
Figure 10:
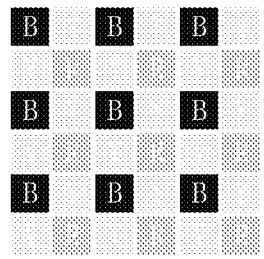
FIG. 10 is a schematic diagram of a red-yellow-yellow-blue (RYYB) sensor according to an embodiment of the present disclosure.
Figure 11:
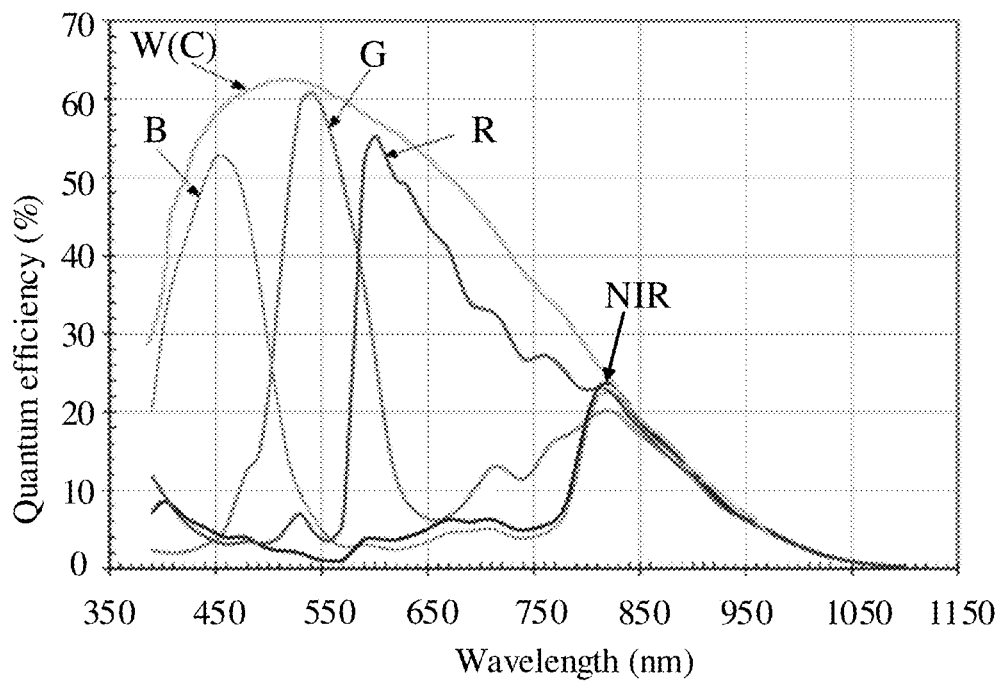
FIG. 11 is a schematic diagram of an induction curve of an image sensor according to an embodiment of the present disclosure.

In some embodiments, the plurality of light sensing channels may include at least two of a light sensing channel R, a light sensing channel G, a light sensing channel B, a light sensing channel Y, a light sensing channel W, and a light sensing channel C. The light sensing channel R is configured to sense light in a red light wave hand and the near-infrared light wave band; the light sensing channel G is configured to sense light in a green light wave band and the near-infrared light wave band; the light sensing channel B is configured to sense light in a blue light wave band and the near-infrared light wave hand; and the light sensing channel Y is configured to sense light in a yellow light wave band and the near-infrared light wave band. In some embodiments, W may represent a light sensing channel configured to sense light in all light wave bands; and in some other embodiments, C may represent a light sensing channel configured to sense the light in all the wave bands. Therefore, when the plurality of light sensing channels include a light sensing channel configured to sense light in all the wave bands, the light sensing channel may be the light sensing channel W or the light sensing channel C. In other words, a light sensing channel configured to sense the light in all the wave bands can be selected according to a usage requirement during practical application. In an exemplary embodiment, the image sensor 01 may be an RGB sensor, an RGBW sensor, an RCCB sensor, or an RYYB sensor. Reference may be made to FIG. 7 for a distribution form of light sensing channels R, light sensing channels G and light sensing channels B of the RGB sensor, reference may be made to FIG. 8 for a distribution form of light sensing channels R, light sensing channels G, light sensing channels B and light sensing channels W of the RGBW sensor, reference may be made to FIG. 9 for a distribution form of light sensing channels R, light sensing channels C and light sensing channels B of the RCCB sensor, and reference may be made to FIG. 10 for a distribution form of light sensing channels R, light sensing channels Y and light sensing channels B of the RYYB sensor.

In some other embodiments, alternatively, some light sensing channels may sense only light in a near-infrared light wave band. In this way, it can be ensured that the first image signal has a full resolution and no pixel value is missed. As an example, the plurality of light sensing channels may include at least two of a light sensing channel R, a light sensing channel 0, a light sensing channel B, and a light sensing channel IR. The light sensing channel R is configured to sense light in a red light wave band and the near-infrared light wave band; the light sensing channel G is configured to sense light in a green light wave band and the near-infrared light wave band; the light sensing channel B is configured to sense light in a blue light wave band and the near-infrared light wave band; and the light sensing channel IR is configured to sense the light in the near-infrared light wave band.

In an exemplary embodiment, the image sensor 01 may be an RGBIR sensor, and each IR light sensing channel of the RGBIR sensor may sense the light in the near-infrared light wave band but may not sense the light in the visible light wave band.

In a case that the image sensor 01 is an RGB sensor, compared with other image sensors (for example an RGBIR sensor), RGB information acquired by the RGB sensor is more complete and color details of an image acquired by the RGI sensor are more accurate, because some light sensing channels of the RGBIR sensor cannot acquire visible light.

It should be noted that, the plurality of light sensing channels included in the image sensor 01 may correspond to a plurality of induction curves. In an exemplary embodiment, referring to FIG. 1I, a curve R represents an induction curve of the image sensor 01 for light in a red light wave band, a curve G represents an induction curve of the image sensor 01 for light in a green light wave band, a curve B represents an induction curve of the image sensor 01 for light in a blue light wave band, a curve W (or C) represents an induction curve of the image sensor 01 for light in all light wave bands, and a curve NIR (near-infrared light) represents art induction curve of the image sensor 01 for light in a near-infrared light wave band.

As an example, the image sensor 01 may use a global shutter manner or rolling shutter manner. The global shutter manner refers to that start moments of exposures of all rows of effective images are the same and end moments of the exposures of all the rows of effective images are the same. In other words, in the global shutter manner, the exposures of all the rows of effective images are started and ended at the same time. The rolling shutter manner refers to that exposures of different rows of effective images do not completely coincident with each other, that is, a start moment of an exposure of one row of effective images is later than a start moment of an exposure of a previous row of effective images, and an end moment of the exposure of one row of effective images is later than an end moment of the exposure of the previous row of effective images, in addition, in the rolling shutter manner, data can be output after the exposure of each row of effective images is ended. Therefore, duration between a data output start moment of the first row of effective images and a data output end moment of the last row of effective images may be represented as readout duration.

Figure 12:
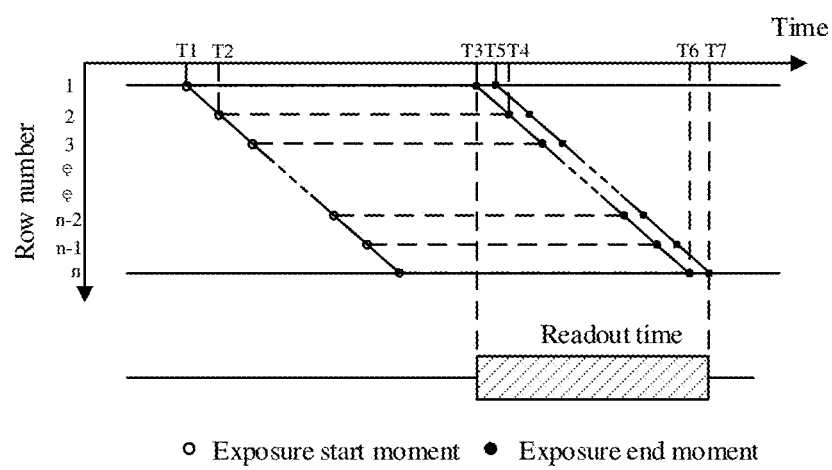
FIG. 12 is a schematic diagram of a rolling shutter manner according to an embodiment of the present disclosure.

In an exemplary embodiment, FIG. 12 shows a schematic diagram of a rolling shutter manner. It can be learned from FIG. 12 that the exposure of the first row of effective images is started at moment T1 and is ended at moment T3; and an exposure of a second row of effective images is started at moment T2 and is ended at moment T4. Moment T2 is one period later than moment T1, and moment T4 is one period later than moment T3. In addition, at moment T3, the exposure of the first row of effective images is ended and data output is started; and at moment T5, the data output is ended. At moment Tb, an exposure of an $n^{th}$ row of effective images is ended and data output is started, and at moment T7, the data output is ended. Therefore, duration between moment T3 and moment T7 is the readout duration.

In some embodiments, the image sensor 01 performs the plurality of exposures in the global shutter manner. For any near-infrared light compensation, there is no intersection between a period of the near-infrared light compensation and the exposure period of the nearest second preset exposure. The period of the near-infrared light compensation is a subset of the exposure period of the first preset exposure, or there is an intersection between the period of the near-infrared light compensation and the exposure period of the first preset exposure, or the exposure period of the first preset exposure is a subset of the period of the near-infrared light compensation. In this case, the near-infrared light compensation is performed in at least part of the exposure period of the first preset exposure but is not performed in the entire exposure period of the second preset exposure, thereby avoiding an impact on the second preset exposure.

Figure 13:
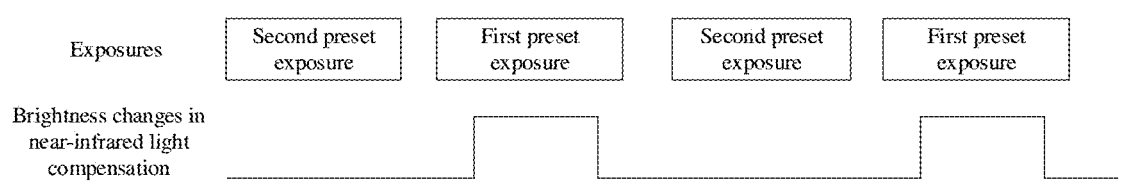
FIG. 13 is a schematic diagram of a sequential relationship between a first preset exposure and a second preset exposure in a first near-infrared light compensation in a global shutter manner according to an embodiment of the present disclosure.
Figure 14:
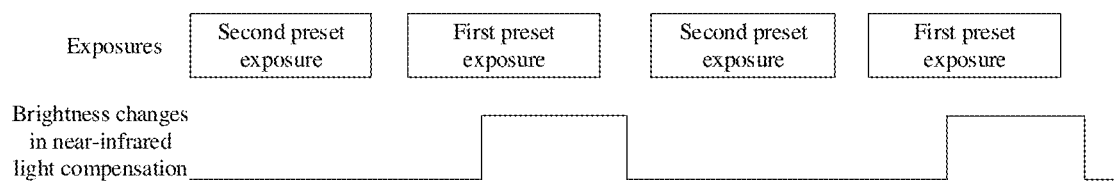
FIG. 14 is a schematic diagram of a sequential relationship between a first preset exposure and a second preset exposure in a second near-infrared light compensation in a global shutter manner according to an embodiment of the present disclosure.
Figure 15:
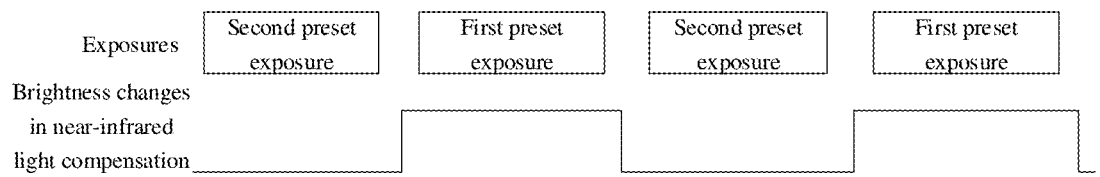
FIG. 15 is a schematic diagram of a sequential relationship between a first preset exposure and a second preset exposure in a third near-infrared light compensation in a global shutter manner according to an embodiment of the present disclosure.

For example, referring to FIG. 13, for any near-infrared light compensation, there is no intersection between a period of the near-infrared light compensation and the exposure period of the nearest second preset exposure; and the period of the near-infrared light compensation is a subset of the exposure period of the first preset exposure. Referring to FIG. 14, for any near-infrared light compensation, there is no intersection between a period of the near-infrared light compensation and the exposure period of the nearest second preset exposure; and there is an intersection between the period of the near-infrared light compensation and the exposure period of the first preset exposure. Referring to FIG. 15, for any near-infrared light compensation, there is no intersection between a period of the near-infrared light compensation and the exposure period of the nearest second preset exposure; and the exposure period of the first preset exposure is a subset of the period of the near-infrared light compensation. FIGS. 13 to 15 are merely examples, and soiling of the first preset exposure and the second preset exposure may not be limited thereto.

In some other embodiments, the image sensor 01 performs the plurality of exposures in a rolling shutter manner. For any near-infrared light compensation, there is no intersection between a period of the near-infrared light compensation and the exposure period of the nearest second preset exposure. In addition, a start moment of the near-infrared light compensation is not earlier than a start moment of an exposure of the last row of effective images in the first preset exposure; and an end moment of the near-infrared light compensation is not later than an end moment of an exposure of a first row of effective images in the first preset exposure. Alternatively, the start moment of the near-infrared light compensation is not earlier than an end moment of an exposure of the last row of effective images in the nearest second preset exposure before the first preset exposure and is not later than the end moment of the exposure of the first row of effective images in the first preset exposure; and the end moment of the near-infrared light compensation is not earlier than the start moment of the exposure of the last row of effective images in the first preset exposure and is not later than a start moment of an exposure of a first row of effective images in the nearest second preset exposure after the first preset exposure. Alternatively, the start moment of the near-infrared light compensation is not earlier than the end moment of the exposure of the last row of effective images in the nearest second preset exposure before the first preset exposure and is not later than a start moment of the exposure of the first row of effective images in the first preset exposure; and the end moment of the near-infrared light compensation is not earlier than an end moment of the exposure of the last row of effective images in the first preset exposure and is not later than the start moment of the exposure of the first row of effective images in the nearest second preset exposure after the first preset exposure.

Figure 16:
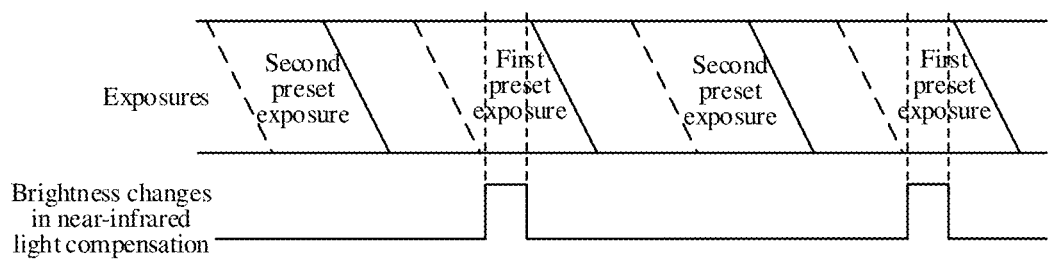
FIG. 16 is a schematic diagram of a sequential relationship between a first preset exposure and a second preset exposure in a first near-infrared light compensation in a rolling shutter manner according to an embodiment of the present disclosure.
Figure 17:
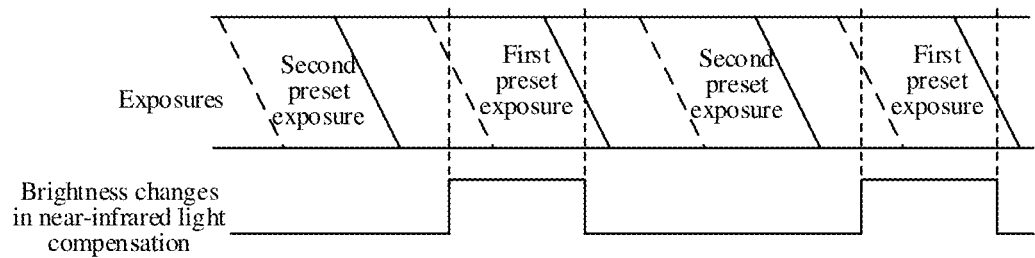
FIG. 17 is a schematic diagram of a sequential relationship between a first preset exposure and a second preset exposure in a second near-infrared light compensation in a rolling shutter manner according to an embodiment of the present disclosure.
Figure 18:
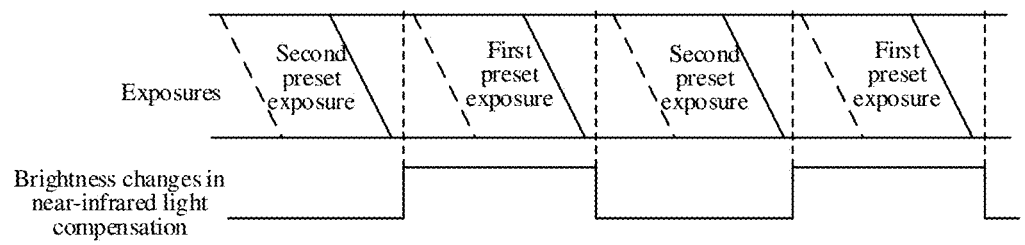
FIG. 18 is a schematic diagram of a sequential relationship between a first preset exposure and a second preset exposure in a third near-infrared light compensation in a rolling shutter manner according to an embodiment of the present disclosure.

For example, referring to FIG. 16, for any near-infrared light compensation, there is no intersection between a period of the near-infrared light compensation and the exposure period of the nearest second preset exposure. In addition, a start moment of the near-infrared light compensation is not earlier than a start moment of an exposure of the last row of effective images in the first preset exposure; and an end moment of the near-infrared light compensation is not later than an end moment of an exposure of a first row of effective images in the first preset exposure. Referring to FIG. 17, for any near-infrared light compensation, there is no intersection between a period of the near-infrared light compensation and the exposure period of the nearest second preset exposure. In addition, the start moment of the near-infrared light compensation is not earlier than an end moment of an exposure of the last row of effective images in the nearest second preset exposure before the first preset exposure and is not later than the end moment of the exposure of the first row of effective images in the first preset exposure; and the end moment of the near-infrared light compensation is not earlier than the start moment of the exposure of the last row of effective images in the first preset exposure and is not later than a start moment of an exposure of a first row of effective images in the nearest second preset exposure after the first preset exposure. Referring to FIG. 18, for any near-infrared light compensation, there is no intersection between a period of the near-infrared light compensation and the exposure period of the nearest second preset exposure. In addition, the start moment of the neat-infrared light compensation is not earlier than the end moment of the exposure of the last row of effective images in the nearest second preset exposure before the first preset exposure and is not later than a start moment of the exposure of the first row of effective images in the first preset exposure; and the end moment of the near-infrared light compensation is not earlier than an end moment of the exposure of the last row of effective images in the first preset exposure and is not later than the start moment of the exposure of the first row of effective images in the nearest second preset exposure after the first preset exposure. In FIGS. 16 to 18, for the first preset exposure and the second preset exposure, a slant dashed line denotes an exposure start moment; and a slant solid line denotes an exposure end moment. For the first preset exposure, an area between vertical dashed lines denotes a period of near-infrared light compensation corresponding to the first preset exposure. FIGS. 16 to 18 are merely examples, and sorting of the first preset exposure and the second preset exposure may not be limited thereto.

The plurality of exposures include odd exposures and even exposures. In this case, the first preset exposure and the second preset exposure may include but are not limited to the following embodiments.

In a first possible embodiment, the first preset exposure is one of the odd exposures; and the second preset exposure is one of the even exposures. In this case, the plurality of exposures may include first preset exposures and second preset exposures that are sorted in an odd-even order. For example, in the plurality of exposures, a first exposure, a third exposure, a fifth exposure and other odd exposures are all first preset exposures; and a second exposure, a fourth exposure, a sixth exposure and other even exposures are all second preset exposures.

In a second possible embodiment, the first preset exposure is one of the even exposures, and the second preset exposure is one of the odd exposures. In this case, the plurality of exposures may include first preset exposures and second preset exposures that are sorted in an even-odd order. For example, in the plurality of exposures, a first exposure, a third exposure, a fifth exposure and other odd exposures are all second preset exposures; and a second exposure, a fourth exposure, a sixth exposure and other even exposures are all first preset exposures.

In a third possible embodiment, the first preset exposure is one of specified exposures of the odd exposures; and the second preset exposure is an exposure different from the specified exposures of the odd exposures. In other words, the second preset exposure may be an odd exposure or even exposure in the plurality of exposures.

In a fourth possible embodiment, the first preset exposure is one of specified exposures of the even exposures; and the second preset exposure is an exposure different from the specified exposures of the even exposures. In other words, the second preset exposure may be an odd exposure or even exposure in the plurality of exposures.

In a fifth possible embodiment, the first preset exposure is an exposure in a first exposure sequence; and the second preset exposure is an exposure in a second exposure sequence.

In a sixth possible embodiment, the first preset exposure is an exposure in the second exposure sequence; and the second preset exposure is an exposure in the first exposure sequence.

The plurality of exposures include a plurality of exposure sequences; and the first exposure sequence and the second exposure sequence are a same or two different exposure sequences of the plurality of exposure sequences. Each exposure sequence includes N exposures, the N exposures include one first preset exposure and N−1 second preset exposures, or the N exposures include one second preset exposure and N−1 first preset exposures, where N is a positive integer greater than 2.

For example, each exposure sequence includes three exposures. These three exposures may include one first preset exposure and two second preset exposures. In this case, in each exposure sequence, a first exposure may be a first preset exposure, and a second exposure and a third exposure are second preset exposures. In other words, each exposure sequence may be represented as: the first preset exposure, the second preset exposure, the second preset exposure. Alternatively, these three exposures may include one second preset exposure and two first preset exposures. In this case, in each exposure sequence, a first exposure may be a second preset exposure, and a second exposure and a third exposure are first preset exposures. In other words, each exposure sequence may be represented as: the second preset exposure, the first preset exposure, the first preset exposure.

The foregoing provides only six possible embodiments of the first preset exposure and the second preset exposure. In actual application, the first preset exposure and the second preset exposure are not limited to the foregoing six possible embodiments. This is not limited in this embodiment of the present disclosure.

Figure 19:
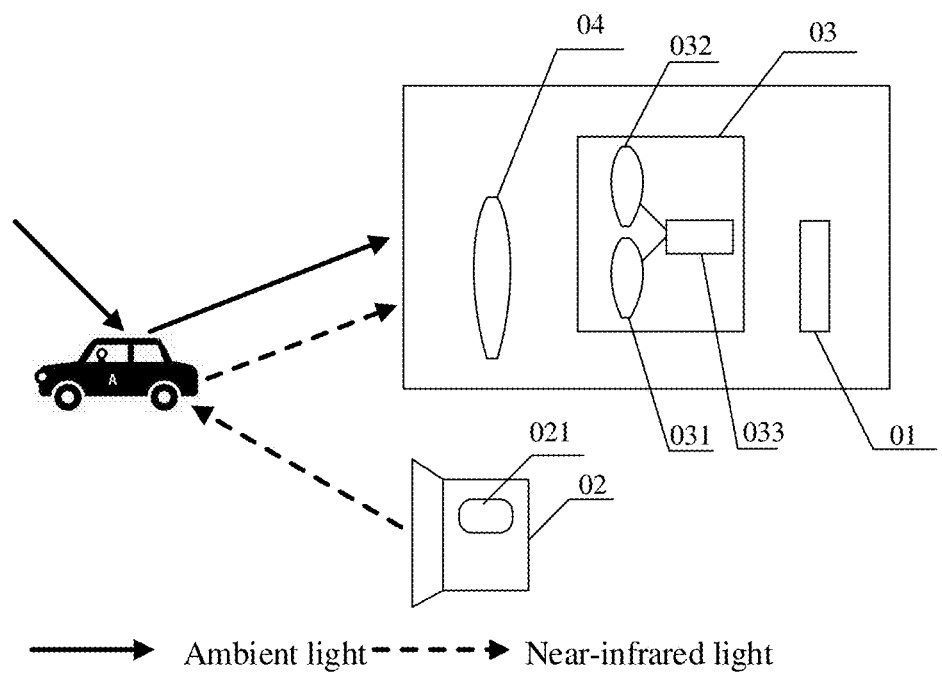
FIG. 19 is a schematic structural diagram of a third apparatus for acquiring an image according to an embodiment of the present disclosure.

In some embodiments, referring to FIG. 19, the light filter assembly 03 further includes a second light filter 032 and a switching component 033, and both the first light filter 031 and the second light filter 032 are connected to the switching component 033. The switching component 033 is configured to switch the second light filter 032 to a light incident side of the image sensor 01. After the second light filter 032 is switched to the light incident side of the image sensor 01, the second light filter 032 allows light in a visible light wave band to pass through and blocks light in a near-infrared light wave band. The image sensor 01 is configured to generate and output a third image signal via an exposure.

It should be noted that, the switching component 033 is configured to switch the second light filter 032 to the light incident side of the image sensor 01, which can be understood as that the second light filter 032 replaces the first light filter 031 on the light incident side of the image sensor 01, After the second light filter 032 is switched to the light incident side of the image sensor 01, the first light compensation apparatus 021 may be on or off.

In summary, when art intensity of visible light in ambient light is weak, for example, at night, an image sensor 01 generates and outputs a first image signal containing near-infrared brightness information and a second image signal containing visible brightness information by the stroboscopic light compensation of a first light compensation apparatus 021. In addition, because both the first image signal and the second image signal are acquired by using the same image sensor 01, viewpoints corresponding to the first image signal and the second image signal are the same, and thus complete information about an external scenario can be acquired according to the first image signal and the second image signal. When the intensity of the visible light is high (for example, in the day), a proportion of near-infrared light is high, and a color reproduction of an acquired image is poor. In this case, a third image signal containing visible brightness information may be generated and output by the image sensor 01. In this way, an image having a better color reproduction can be acquired even in the day and real color information of an external scenario can be acquired efficiently and simply regardless of the intensity of the visible light being high or low, or day or at night, thereby improving the compatibility with another image acquisition device.

According to the present disclosure, an exposure time sequence of an image sensor is used to control a near-infrared light compensation time sequence of a light compensation apparatus, so that near-infrared light compensation is performed and a first image signal is generated during a first preset exposure, and a second image signal is generated during a second preset exposure without performing the near-infrared light compensation. In this data acquisition manner, the first image signal and the second image signal that have different brightness information can be acquired while a structure is simplified and a cost is reduced. That is, two different image signals can be acquired by using one image sensor, which makes the apparatus for acquiring an image to be simpler and more convenient, and acquiring the first image signal and the second image signal to be more efficiently. In addition, because both the first image signal and the second image signal are generated and output by the same image sensor, viewpoints corresponding to the first image signal and the second image signal are the same. Therefore, the first image signal and the second image signal cart jointly acquire information about art external scenario, and there is no misalignment of images generated according to the first image signal and the second image signal because the viewpoint corresponding to the first image signal is not the same as the viewpoint corresponding to the second image signal.

Figure 20:
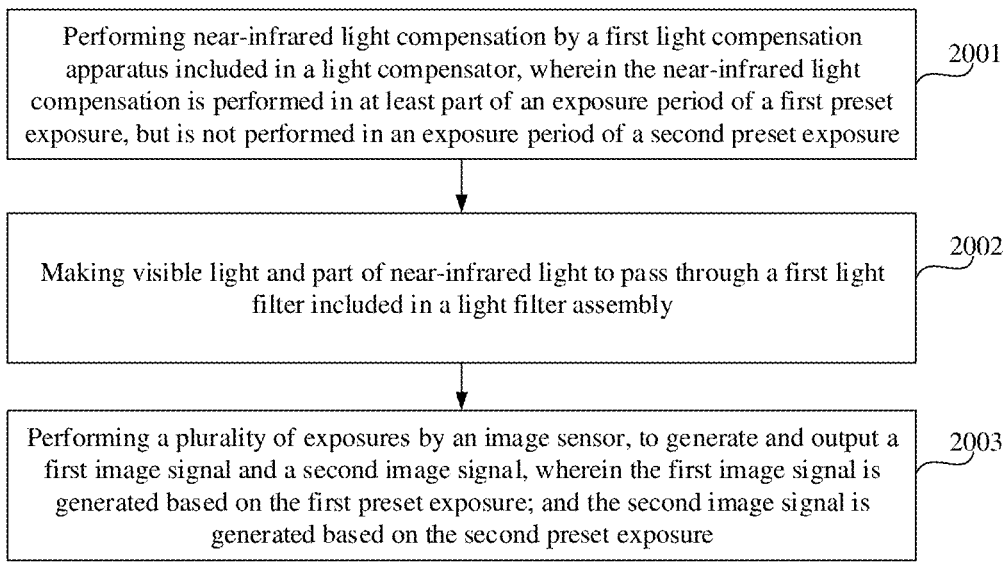
FIG. 20 is a flowchart of a method for acquiring an image according to an embodiment of the present disclosure.

Based on the foregoing description of the apparatus for acquiring an image, the apparatus for acquiring an image can generate and output the first image signal and the second image signal via the plurality of exposures. The following describes a method for acquiring an image based on the apparatus for acquiring an image according to the embodiments shown in FIGS. 1 to 19, Referring to FIG. 20, the method includes the following steps.

In step 2001, near-infrared light compensation is performed by a first light compensation apparatus included in the light compensator. The near-infrared light compensation is performed in at least part of an exposure period of a first preset exposure but is not performed in an exposure period of a second preset exposure, and the first preset exposure and the second preset exposure are two of a plurality of exposures performed by an image sensor.

In step 2002, a first light filter included in a light filter assembly is used to allow visible light and part of near-infrared light to pass through.

In step 2003, a plurality of exposures are performed by an image sensor to generate and output a first, image signal and a second image signal. The first image signal is generated based on the first preset exposure and the second image signal is generated based on the second preset exposure.

In a possible embodiment, the light filter assembly may further include a second light filter and a switching component. In this case, the switching component may be used to switch the second light filter to a light incident side of the image sensor. After the second light filter is switched to the light incident side of the image sensor, the second light filter allows light in a visible light wave band to pass through, but blocks light in a near-infrared light wave band. After the light in the visible light wave hand passes through the second light filter and the light in the near-infrared light wave band is blocked by the second light filter, an exposure is performed by the image sensor to generate and output a third image signal.

In a possible embodiment, the light compensator may further include a second light compensation apparatus. In this case, visible light compensation is performed by the second light compensation apparatus before the light in the visible light wave band and the light in the near-infrared light wave band pass through the first light filter included in the light filter assembly.

In a possible embodiment, an intensity of near-infrared light passing through the first light filter when the first light compensation apparatus performs the near-infrared light compensation is higher than an intensity of near-infrared light passing through the first light filter when the first light compensation apparatus does not perform the near-infrared light compensation.

In a possible embodiment, a wave band range of near-infrared light incident to the first light filter is a first reference wave band range, and the first reference wave band range is 650 nm to 1100 nm.

In a possible embodiment, when a central wavelength for the near-infrared light compensation by the first light compensation apparatus is a specified characteristic wavelength or falls within a specified characteristic wavelength range, a central wavelength and/or a wave-band width of the near-infrared light passing through the first light filter meets) a constraint condition.

In a possible embodiment, the central wavelength for the near-infrared light compensation by the first light compensation apparatus is any wavelength in a wavelength range of 740 nm to 760 nm, or of 770 nm to 790 nm, or of 930 nm to 950 nm.

In a possible embodiment, the constraint condition includes: a difference between the central wavelength of the near-infrared light passing through the first light filter and the central wavelength for the near-infrared light compensation by the first light compensation apparatus is within a wavelength fluctuation range, and the wavelength fluctuation range is 0 nm to 20 nm.

In a possible embodiment, the constraint condition includes: a semi-bandwidth of the near-infrared light passing through the first light filter is less than or equal to 50 nm.

In a possible embodiment, the constraint condition includes: a first wave-band width is less than a second wave-band width, the first wave-band width is the wave-band width of the near-infrared light passing through the first light filter, and the second wave-band width is a wave-band width of near-infrared light blocked by the first light filter.

In a possible embodiment, the constraint condition is: a third wave-band width is less than a reference wave-band width, the third wave-band width is a wave-band width of near-infrared light with a passing rate being greater than a specified proportion, and the reference wave-band width is any wave-band width in a wave band range of 50 nm to 150 nm.

In a possible embodiment, the specified proportion is any proportion in a proportion range of 30% to 50%.

In a possible embodiment, at least one exposure parameter of the first preset exposure is different from that of the second preset exposure; the at least one exposure parameter includes one or more of exposure time, an exposure gain and an aperture size; and the exposure gain includes an analog gain and/or a digital gain.

In a possible embodiment, an exposure gain of the first preset exposure is less than an exposure gain of the second preset exposure.

In a possible embodiment, at least one exposure parameter of the first preset exposure is the same as that of the second preset exposure; the at least one exposure parameter includes one or more of exposure time, an exposure gain and an aperture size; and the exposure gain includes an analog gain and/or a digital gain.

In a possible embodiment, exposure time of the first preset exposure is equal to exposure time of the second preset exposure.

In a possible embodiment, the image sensor includes a plurality of light sensing channels; and each light sensing channel is configured to sense at least one type of light in a visible light wave band, and sense light in a near-infrared light wave band.

In a possible embodiment, the plurality of light sensing channels are configured to sense at least two different types of light in the visible light wave band.

In a possible embodiment, the plurality of light sensing channels include at least two of a light sensing channel R, a light sensing channel G, a light sensing channel B, a light sensing channel Y, a light sensing channel W and a light sensing channel C.

The light sensing channel R is configured to sense light in a red light wave band and the near-infrared light wave band; the light sensing channel G is configured to sense light in a green light wave band and the near-infrared light wave band; the light sensing channel B is configured to sense light in a blue light wave band and the near-infrared light wave band; the light sensing channel Y is configured to sense light in a yellow light wave band and the near-infrared light wave band; the light sensing channel W is configured to sense light in all light wave bands; and the light sensing channel C is configured to sense light in all the wave bands.

In a possible embodiment, the image sensor is an RGB sensor, an RGBW sensor, an RCCB sensor, or an RYYB sensor.

In a possible embodiment, the second light compensation apparatus is configured to perform visible light compensation in a normally bright manner; or the second light compensation apparatus is configured to perform the visible light compensation in a stroboscopic manner, where the visible light compensation is performed in at least part of the exposure period of the first preset exposure but is not performed in the entire exposure period of the second preset exposure; or the second light compensation apparatus is configured to perform the visible light compensation in a stroboscopic manner, where the visible light compensation is not performed in at least the entire exposure period of the first preset exposure but is performed in part of the exposure period of the second preset exposure.

In a possible embodiment, the number of light compensation performed by the first light compensation apparatus in unit time is less than the number of exposures performed by the image sensor in unit time, where one or more exposures are performed between every two adjacent times of light compensation.

In a possible embodiment, the image sensor performs the plurality of exposures in a global shutter manner. For any near-infrared light compensation, there is no intersection between a period of the near-infrared light compensation and the exposure period of the nearest second preset exposure; and the period of the near-infrared light compensation is a subset of the exposure period of the first preset exposure; or there is an intersection between the period of the near-infrared light compensation and the exposure period of the first preset exposure; or the exposure period of the first preset exposure is a subset of the period of the near-infrared light compensation.

In a possible embodiment, the image sensor performs the plurality of exposures in a rolling shutter manner, where for any near-infrared light compensation, there is no intersection between a period of the near-infrared light compensation and the exposure period of the nearest second preset exposure; and a start moment of the near-infrared light compensation is not earlier than a start moment of an exposure of the last row of effective images in the first preset exposure; and an end moment of the near-infrared light compensation is not later than an end moment of an exposure of a first row of effective images in the first preset exposure; or, the start moment of the near-infrared light compensation is not earlier than an end moment of an exposure of the last row of effective images in the nearest second preset exposure before the first preset exposure and is not later than the end moment of the exposure of the first row of effective images in the first preset exposure; and the end moment of the near-infrared light compensation is not earlier than the start moment of the exposure of the last row of effective images in the first preset exposure and is not later than a start moment of an exposure of a first row of effective images in the nearest second preset exposure after the first preset exposure; or the start moment of the near-infrared light compensation is not earlier than the end moment of the exposure of the last row of effective images in the nearest second preset exposure before the first preset exposure and is not later than a start moment of the exposure of the first row of effective images in the first preset exposure; and the end moment of the near-infrared light compensation is not earlier than an end moment of the exposure of the last row of effective images in the first preset exposure and is not later than the start moment of the exposure of the first row of effective images in the nearest second preset exposure after the first preset exposure.

In a possible embodiment, the plurality of exposures include odd exposures and even exposures.

The first preset exposure is one of the odd exposures; and the second preset exposure is one of the even exposures; or the first preset exposure is one of the even exposures; and the second preset exposure is one of the odd exposures; or the first preset exposure is one of specified exposures of the odd exposures; and the second preset exposure is an exposure different from the specified exposures of the odd exposures; or the first preset exposure is one of specified exposures of the even exposures; and the second preset exposure is an exposure different from the specified exposures of the even exposures; or the first preset exposure is an exposure in a first exposure sequence; and the second preset exposure is an exposure in a second exposure sequence; or the first preset exposure is an exposure in the second exposure sequence; and the second preset exposure is an exposure in the first exposure sequence; the plurality of exposures include a plurality of exposure sequences; the first exposure sequence and the second exposure sequence are one or two exposure sequences of the plurality of exposure sequences; each exposure sequence includes N exposures; and the N exposures include one first preset exposure and N−1 second preset exposures; or the N exposures include one second preset exposure and N−1 first preset exposures, where N is a positive integer greater than 2.

It should be noted that, this embodiment may use the same invention idea as the embodiments shown in FIGS. 1 to 19. Therefore, for explanation of content of this embodiment, reference may be made to explanation of related content in the embodiments shown in FIGS. 1 to 19. Details are not described herein again.

In this embodiment of the present disclosure, the first image signal and the second image signal may be acquired by performing the plurality of exposures by the image sensor. In this way, two different image signals can be acquired by using one image sensor, which makes the apparatus for acquiring an image to be simpler and more convenient and acquiring the first image signal and the second image signal to be more efficiently. In addition, because both the first image signal and the second image signal are generated and output by the same image sensor, viewpoints corresponding to the first image signal and the second image signal are the same. Therefore, the first image signal and the second image signal can jointly acquire information about an external scenario, and there is no misalignment of images generated according to the first image signal and the second image signal because the viewpoint corresponding to the first image signal is not the same as the viewpoint corresponding to the second image signal.

The foregoing descriptions are merely optional embodiments of the present disclosure, but are not intended not to limit the present disclosure. Any modification, equivalent replacement, or improvement made without departing from the spirit and principle of the present disclosure shall fall within the protection scope of the present disclosure.

What is claimed is:

1. An apparatus for acquiring an image, comprising an image sensor, a light compensator, and a light filter assembly, wherein, the image sensor is on a light output side of the light filter assembly;

the image sensor is configured to generate and output a first image signal and a second image signal by a plurality of exposures, wherein the first image signal is generated according to a first preset exposure, the second image signal is generated according to a second preset exposure, and the first preset exposure and the second preset exposure are two of the plurality of exposures;

the light compensator comprises a first light compensation apparatus, wherein the first light compensation apparatus is configured to perform near-infrared light compensation, and the near-infrared light compensation is performed in at least part of an exposure period of the first preset exposure but is not performed in an exposure period of the second preset exposure; and the light filter assembly comprises a first light filter, wherein the first light filter allows visible light and part of near-infrared light to pass through;

wherein, in a case that a central wavelength for the near-infrared light compensation by the first light compensation apparatus is a specified characteristic wavelength or falls within a specified characteristic wavelength range, a central wavelength and/or a wave-band width of the near-infrared light passing through the first light filter meet(s) a constraint condition; and wherein the constraint condition comprises:
  a difference between the central wavelength of the near-infrared light passing through the first light filter and the central wavelength for the near-infrared light compensation by the first light compensation apparatus is within a wavelength fluctuation range, and the wavelength fluctuation range is 0 nm to 20 nm;
  a semi-bandwidth of the near-infrared light passing through the first light filter is less than or equal to 50 nm;
  a first wave-band width is less than a second wave-band width, wherein the first wave-band width is a wave-band width of the near-infrared light passing through the first light filter; and the second wave-band width is a wave-band width of near-infrared light blocked by the first light filter; or a third wave-band width is less than a reference wave-band width, wherein the third wave-band width is a wave-band width of near-infrared light with a passing rate being greater than a specified proportion, and the reference wave-band width is any wave-band width in a wave band range of 50 nm to 150 nm.

2. The apparatus for acquiring an image according to claim 1, wherein an intensity of near-infrared light passing through the first light filter when the first light compensation apparatus performs the near-infrared light compensation is higher than an intensity of near-infrared light passing through the first light filter when the first light compensation apparatus does not perform the near-infrared light compensation.

3. The apparatus for acquiring an image according to claim 1, wherein the light filter assembly further comprises a second light filter and a switching component, and both the first light filter and the second light filter are connected to the switching component;

the switching component is configured to switch the second light filter to a light incident side of the image sensor, and after the second light filter is switched to the light incident side of the image sensor, the second light filter allows light in a visible light wave band to pass through and blocks light in a near-infrared light wave band; and the image sensor is configured to generate and output a third image signal by an exposure.

4. The apparatus for acquiring an image according to claim 1, wherein a wave band range of near-infrared light incident to the first light filter is a first reference wave band range, and the first reference wave band range is 650 nm to 1100 nm.

5. The apparatus for acquiring an image according to claim 1, wherein the central wavelength for the near-infrared light compensation by the first light compensation apparatus is any wavelength in a wavelength range of 740 nm to 760 nm, or of 770 nm to 790 nm, or of 930 nm to 950 nm.

6. The apparatus for acquiring an image according to claim 1, wherein at least one exposure parameter of the first preset exposure is different from that of the second preset exposure, the at least one exposure parameter comprises one or more of exposure time, an exposure gain, and an aperture size, and the exposure gain comprises an analog gain and/or a digital gain; and an exposure gain of the first preset exposure is less than an exposure gain of the second preset exposure;

or, wherein at least one exposure parameter of the first preset exposure is the same as that of the second preset exposure, the at least one exposure parameter comprises one or more of exposure time, an exposure gain, and an aperture size, and the exposure gain comprises an analog gain and/or a digital gain; and exposure time of the first preset exposure is equal to exposure time of the second preset exposure.

7. The apparatus for acquiring an image according to claim 1, wherein the image sensor comprises a plurality of light sensing channels, and each light sensing channel is configured to sense at least one type of light in a visible light wave band and light in a near-infrared light wave band; and wherein the plurality of light sensing channels are configured to sense at least two different types of light in the visible light wave band.

8. The apparatus for acquiring an image according to claim 7, wherein the plurality of light sensing channels comprise at least two of a light sensing channel R, a light sensing channel G, a light sensing channel B, a light sensing channel Y, a light sensing channel W, and a light sensing channel C; and wherein the light sensing channel R is configured to sense light in a red light wave band and the near-infrared light wave band, the light sensing channel G is configured to sense light in a green light wave band and the near-infrared light wave band, the light sensing channel B is configured to sense light in a blue light wave band and the near-infrared light wave band, the light sensing channel Y is configured to sense light in a yellow light wave band and the near-infrared light wave band, the light sensing channel W is configured to sense light in all light wave bands, and the light sensing channel C is configured to sense light in all the wave bands.

9. The apparatus for acquiring an image according to claim 8, wherein the image sensor is a red-green-blue (RGB) sensor, a red-green-blue-white (RGBW) sensor, a red-cyan-cyan-blue (RCCB) sensor, or a red-yellow-yellow-blue (RYYB) sensor.

10. The apparatus for acquiring an image according to claim 1, wherein the light compensator further comprises a second light compensation apparatus, and the second light compensation apparatus is configured to perform visible light compensation; and wherein the second light compensation apparatus is configured to perform the visible light compensation in a constantly bright manner;

the second light compensation apparatus is configured to perform the visible light compensation in a stroboscopic manner, and the visible light compensation is performed in at least part of the exposure period of the first preset exposure but is not performed in an entire exposure period of the second preset exposure; or the second light compensation apparatus is configured to perform the visible light compensation in a stroboscopic manner, and the visible light compensation is not performed in an entire exposure period of the first preset exposure but is performed in at least part of the exposure period of the second preset exposure.

11. The apparatus for acquiring an image according to claim 1, wherein the image sensor performs the plurality of exposures in a global shutter manner, for any near-infrared light compensation, there is no intersection between a period of the near-infrared light compensation and an exposure period of a nearest second preset exposure; and the period of the near-infrared light compensation is a subset of the exposure period of the first preset exposure, or there is an intersection between the period of the near-infrared light compensation and the exposure period of the first preset exposure, or the exposure period of the first preset exposure is a subset of the period of the near-infrared light compensation.

12. The apparatus for acquiring an image according to claim 1, wherein the image sensor performs the plurality of exposures in a rolling shutter manner, for any near-infrared light compensation, there is no intersection between a period of the near-infrared light compensation and an exposure period of a nearest second preset exposure; and a start moment of the near-infrared light compensation is not earlier than a start moment of an exposure of a last row of effective images in the first preset exposure; and an end moment of the near-infrared light compensation is not later than an end moment of an exposure of a first row of effective images in the first preset exposure;

or, the start moment of the near-infrared light compensation is not earlier than an end moment of an exposure of the last row of effective images in the nearest second preset exposure before the first preset exposure and is not later than the end moment of the exposure of the first row of effective images in the first preset exposure; and the end moment of the near-infrared light compensation is not earlier than the start moment of the exposure of the last row of effective images in the first preset exposure and is not later than a start moment of an exposure of a first row of effective images in the nearest second preset exposure after the first preset exposure; or the start moment of the near-infrared light compensation is not earlier than the end moment of the exposure of the last row of effective images in the nearest second preset exposure before the first preset exposure and is not later than a start moment of the exposure of the first row of effective images in the first preset exposure; and the end moment of the near-infrared light compensation is not earlier than an end moment of the exposure of the last row of effective images in the first preset exposure and is not later than the start moment of the exposure of the first row of effective images in the nearest second preset exposure after the first preset exposure.

13. The apparatus for acquiring an image according to claim 1, wherein the plurality of exposures comprises odd exposures and even exposures, wherein the first preset exposure is one of the odd exposures, and the second preset exposure is one of the even exposures; or the first preset exposure is one of the even exposures, and the second preset exposure is one of the odd exposures; or the first preset exposure is one of specified exposures of the odd exposures and the second preset exposure is an exposure different from the specified exposures of the odd exposures; or the first preset exposure is one of specified exposures of the even exposures and the second preset exposure is an exposure different from the specified exposures of the even exposures; or the first preset exposure is an exposure in a first exposure sequence and the second preset exposure is an exposure in a second exposure sequence; or the first preset exposure is an exposure in the second exposure sequence and the second preset exposure is an exposure in the first exposure sequence; and wherein the plurality of exposures comprise a plurality of exposure sequences, the first exposure sequence and the second exposure sequence are one or two exposure sequences of the plurality of exposure sequences, each exposure sequence comprises N exposures, and the N exposures comprise one first preset exposure and N−1 second preset exposures or the N exposures comprise one second preset exposure and N−1 first preset exposures, and N is a positive integer greater than 2.

14. A method for acquiring an image, applied to an apparatus for acquiring an image, wherein the apparatus for acquiring an image comprises an image sensor, a light compensator, and a light filter assembly, the light compensator comprises a first light compensation apparatus, the light filter assembly comprises a first light filter, the image sensor is on a light output side of the light filter assembly, and the method comprises:

performing near-infrared light compensation by the first light compensation apparatus, wherein the near-infrared light compensation is performed in at least part of an exposure period of a first preset exposure but is not performed in an exposure period of a second preset exposure, and the first preset exposure and the second preset exposure are two of a plurality of exposures performed by the image sensor;

enabling visible light and part of near-infrared light to pass through the first light filter; and performing the plurality of exposures by the image sensor to generate and output a first image signal and a second image signal, wherein the first image signal is generated according to the first preset exposure and the second image signal is generated according to the second preset exposure;

wherein, in a case that a central wavelength for the near-infrared light compensation by the first light compensation apparatus is a specified characteristic wavelength or falls within a specified characteristic wavelength range, a central wavelength and/or a wave-band width of the near-infrared light passing through the first light filter meets) a constraint condition; and wherein the constraint condition comprises:

a difference between the central wavelength of the near-infrared light passing through the first light filter and the central wavelength for the near-infrared light compensation by the first light compensation apparatus is within a wavelength fluctuation range, and the wavelength fluctuation range is 0 nm to 20 nm;

a semi-bandwidth of the near-infrared light passing through the first light filter is less than or equal to 50 nm;

a first wave-band width is less than a second wave-band width, wherein the first wave-band width is a wave-band width of the near-infrared light passing through the first light filter; and the second wave-band width is a wave-band width of near-infrared light blocked by the first light filter; or a third wave-band width is less than a reference wave-band width, wherein the third wave-band width is a wave-band width of near-infrared light with a passing rate being greater than a specified proportion, and the reference wave-band width is any wave-band width in a wave band range of 50 nm to 150 nm.

15. The method according to claim 14, wherein in a case that a central wavelength for the near-infrared light compensation by the first light compensation apparatus is a specified characteristic wavelength or falls within a specified characteristic wavelength range, a central wavelength and/or a wave-band width of the near-infrared light passing through the first light filter meets) a constraint condition; and wherein the central wavelength for the near-infrared light compensation by the first light compensation apparatus is any wavelength in a wavelength range of 740 nm to 760 nm, or of 770 nm to 790 nm, or of 930 nm to 950 nm.

16. The method according to claim 15, wherein the constraint condition comprises:

a difference between the central wavelength of the near-infrared light passing through the first light filter and the central wavelength for the near-infrared light compensation by the first light compensation apparatus is within a wavelength fluctuation range, and the wavelength fluctuation range is 0 nm to 20 nm; or a semi-bandwidth of the near-infrared light passing through the first light filter is less than or equal to 50 nm; or a first wave-band width is less than a second wave-band width, wherein the first wave-band width is a wave-band width of the near-infrared light passing through the first light filter; and the second wave-band width is a wave-band width of near-infrared light blocked by the first light filter; or a third wave-band width is less than a reference wave-band width, wherein the third wave-band width is a wave-band width of near-infrared light with a passing rate being greater than a specified proportion, and the reference wave-band width is any wave-band width in a wave band range of 50 nm to 150 nm.

17. The method according to claim 14, wherein at least one exposure parameter of the first preset exposure is different from that of the second preset exposure, the at least one exposure parameter comprises one or more of exposure time, an exposure gain, and an aperture size, and the exposure gain comprises an analog gain and/or a digital gain;

or, wherein at least one exposure parameter of the first preset exposure is the same as that of the second preset exposure, the at least one exposure parameter comprises one or more of exposure time, an exposure gain, and an aperture size, and the exposure gain comprises an analog gain and/or a digital gain.

18. The method according to claim 14, wherein the image sensor comprises a plurality of light sensing channels, and each light sensing channel is configured to sense at least one type of light in a visible light wave band and light in a near-infrared light wave band;

wherein the image sensor performs the plurality of exposures in a global shutter manner, for any near-infrared light compensation, there is no intersection between a period of the near-infrared light compensation and an exposure period of a nearest second preset exposure; and the period of the near-infrared light compensation is a subset of the exposure period of the first preset exposure, or there is an intersection between the period of the near-infrared light compensation and the exposure period of the first preset exposure, or the exposure period of the first preset exposure is a subset of the period of the near-infrared light compensation; or, wherein the image sensor performs the plurality of exposures in a rolling shutter manner, for any near-infrared light compensation, there is no intersection between a period of the near-infrared light compensation and an exposure period of a nearest second preset exposure; and a start moment of the near-infrared light compensation is not earlier than a start moment of an exposure of a last row of effective images in the first preset exposure; and the end moment of the near-infrared light compensation is not later than an end moment of an exposure of a first row of effective images in the first preset exposure;

or, the start moment of the near-infrared light compensation is not earlier than an end moment of an exposure of the last row of effective images in the nearest second preset exposure before the first preset exposure and is not later than the end moment of the exposure of the first row of effective images in the first preset exposure; and the end moment of the near-infrared light compensation is not earlier than the start moment of the exposure of the last row of effective images in the first preset exposure and is not later than a start moment of an exposure of a first row of effective images in the nearest second preset exposure after the first preset exposure; or the start moment of the near-infrared light compensation is not earlier than the end moment of the exposure of the last row of effective images in the nearest second preset exposure before the first preset exposure and is not later than a start moment of the exposure of the first row of effective images in the first preset exposure; and the end moment of the near-infrared light compensation is not earlier than an end moment of the exposure of the last row of effective images in the first preset exposure and is not later than the start moment of the exposure of the first row of effective images in the nearest second preset exposure after the first preset exposure.

* * * * *